No. 797,533. PATENTED AUG. 15, 1905.
R. M. G. PHILLIPS.
MOTOR CARRIAGE.
APPLICATION FILED AUG. 22, 1903.
7 SHEETS—SHEET 4.
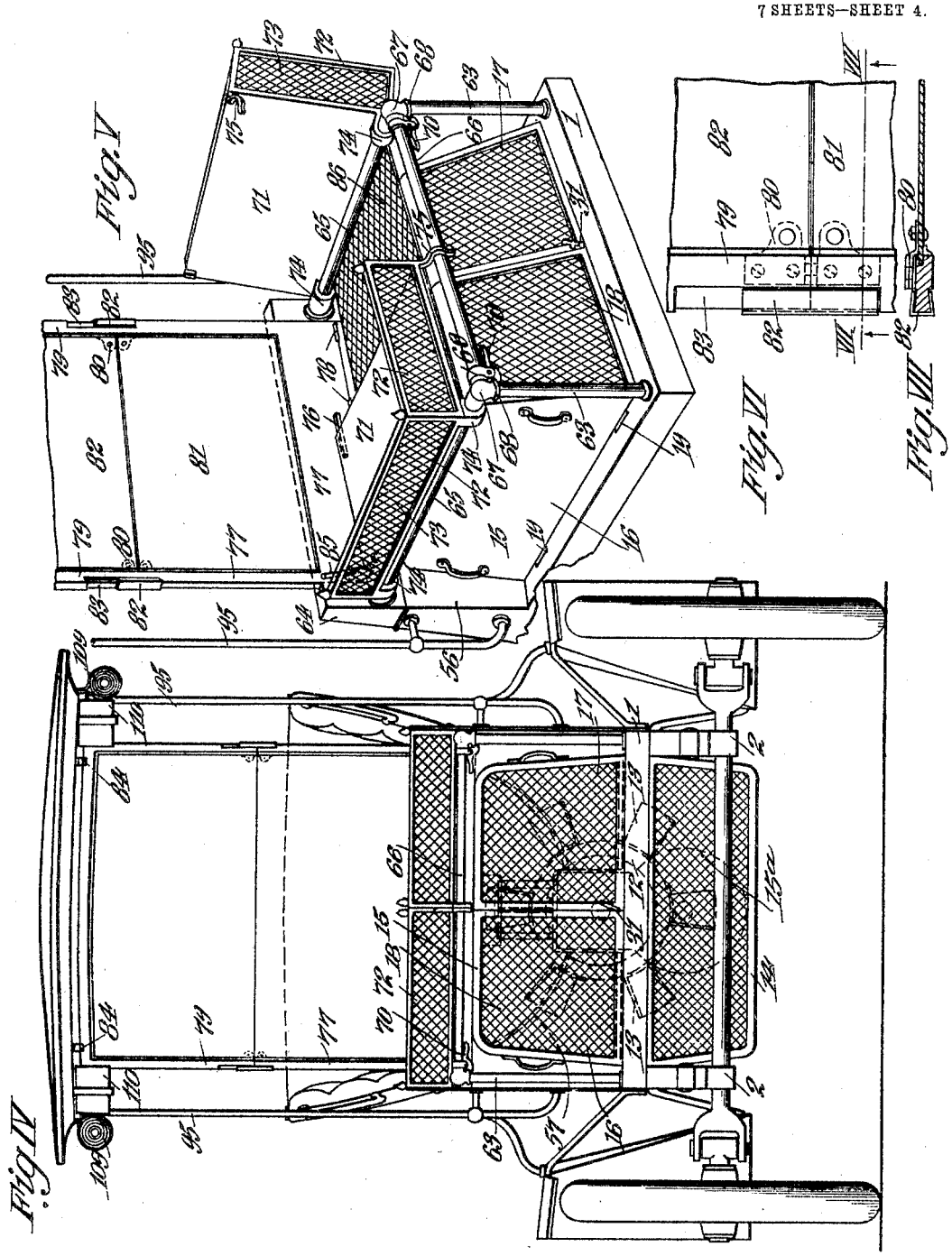
Witnesses
Geo. L. Goetz
G. T. Hackley
Inventor
Ross M. G. Phillips
by Townsend Bros.
his attys.

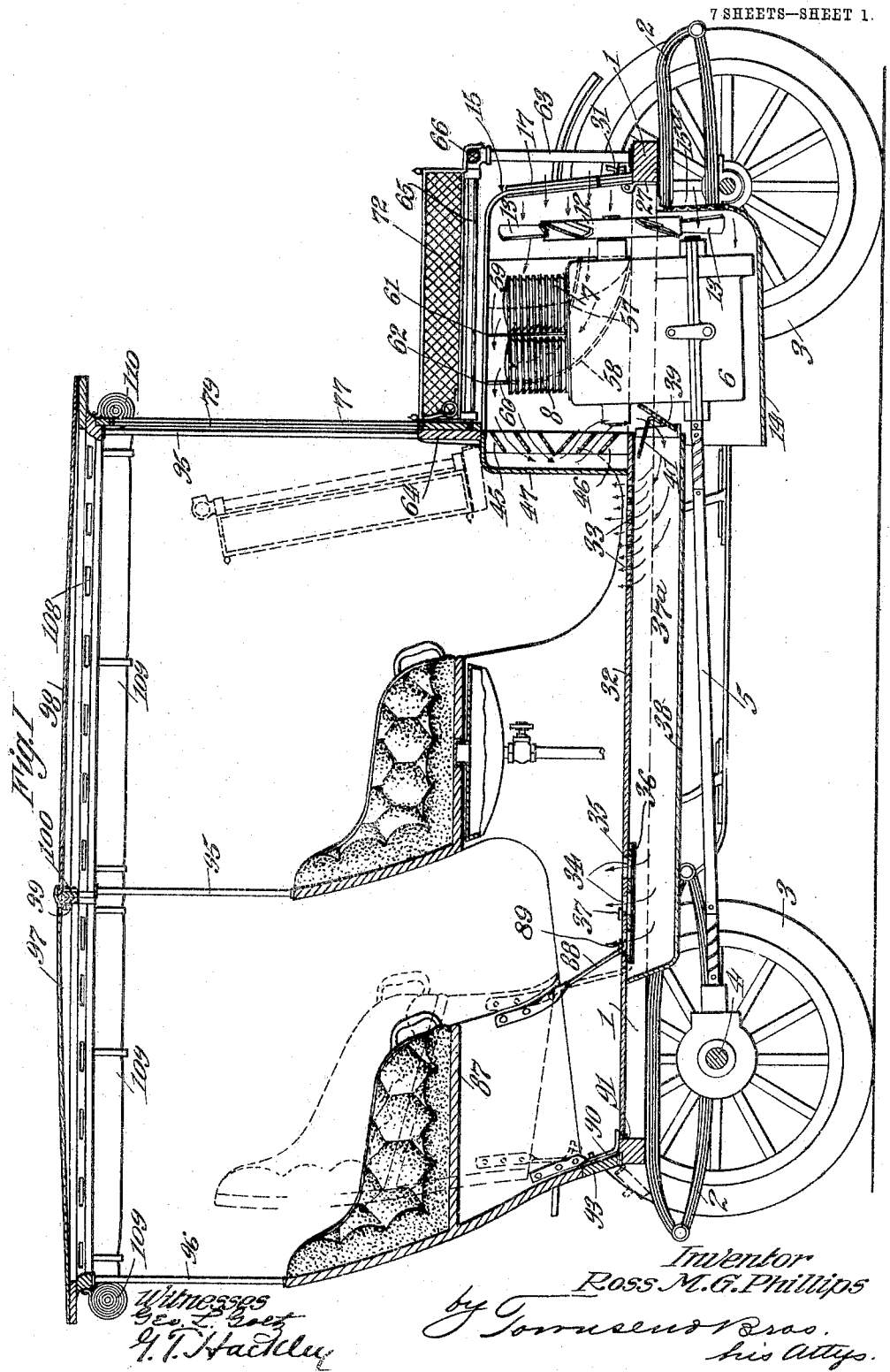

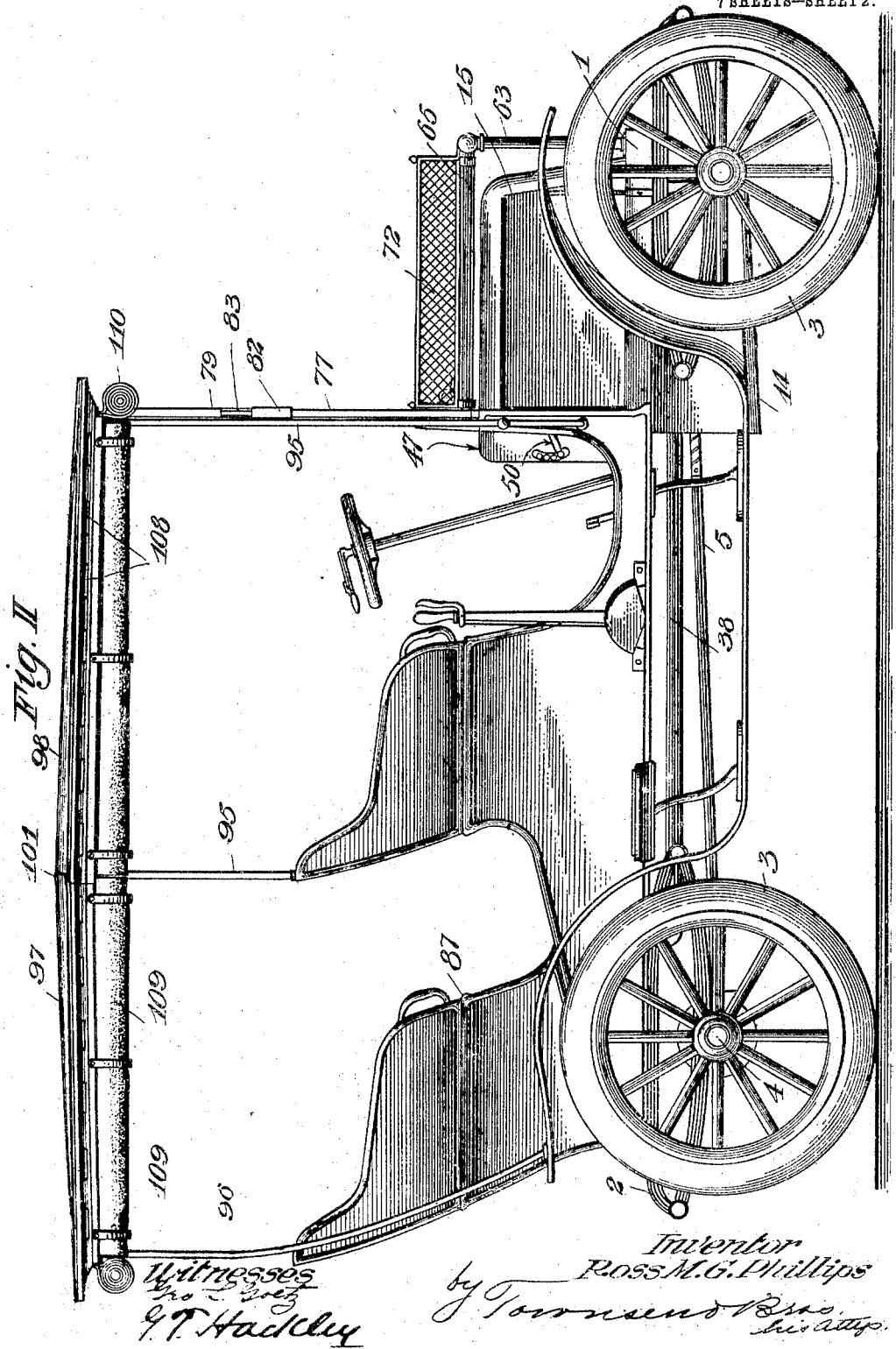

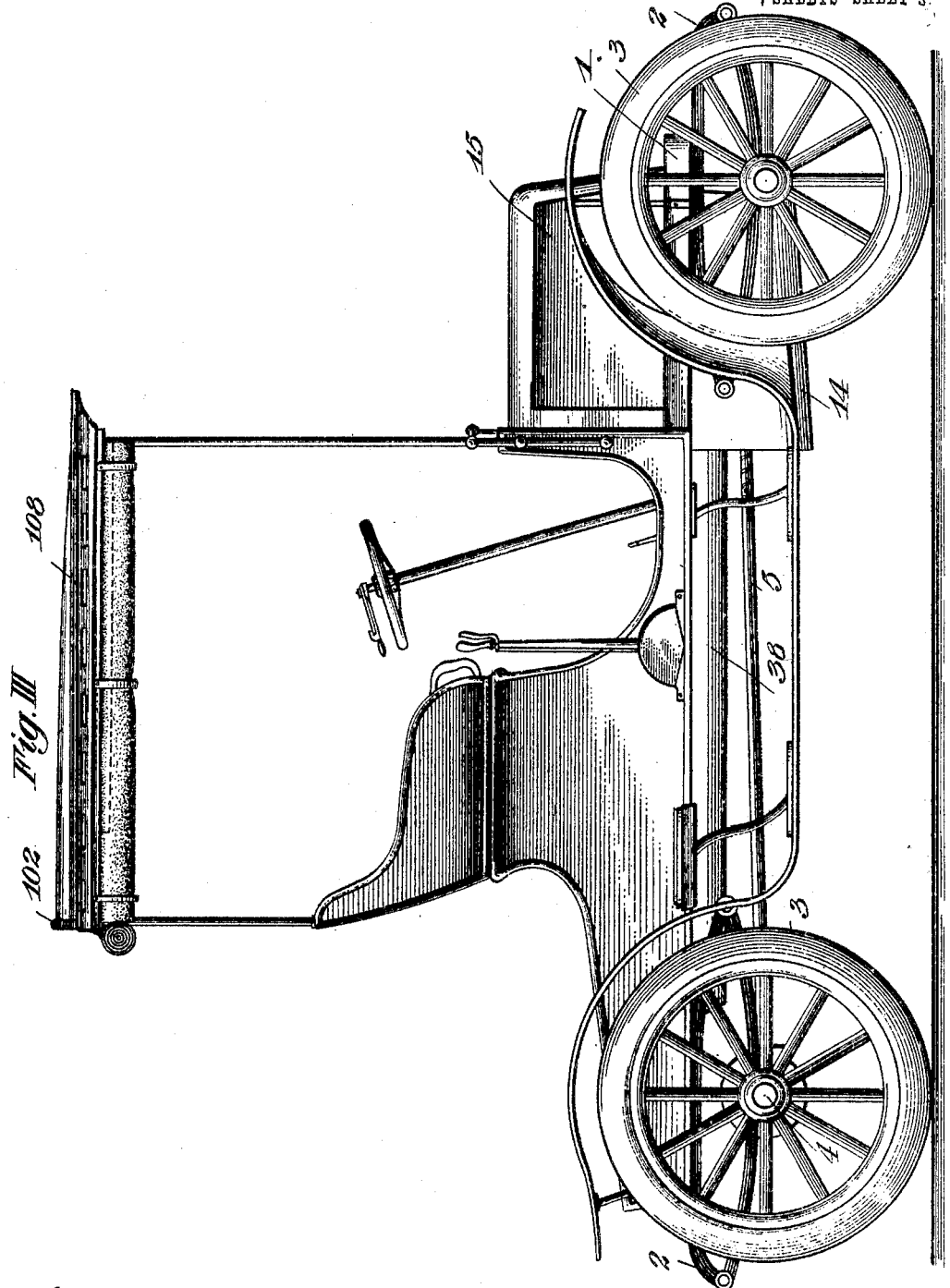

No. 797,533. PATENTED AUG. 15, 1905.
R. M. G. PHILLIPS.
MOTOR CARRIAGE.
APPLICATION FILED AUG. 22, 1903.
7 SHEETS—SHEET 5.
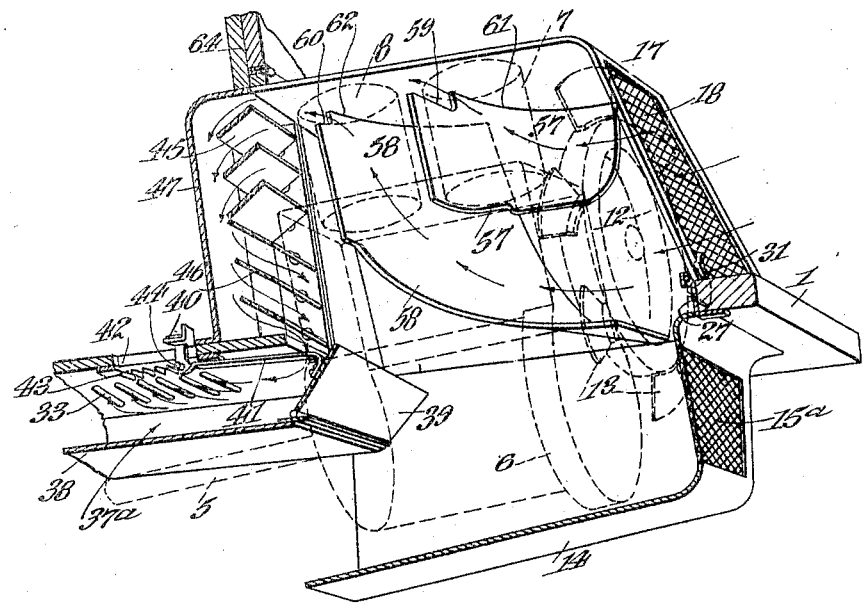
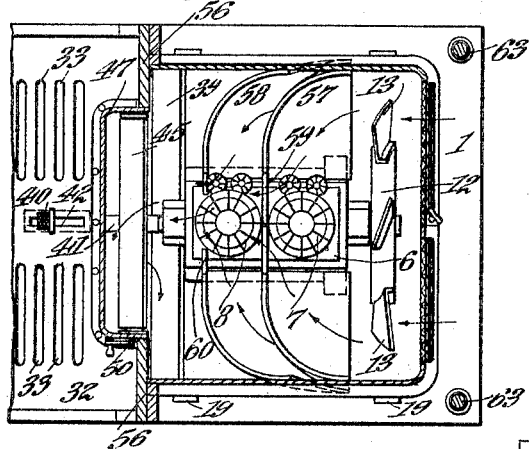
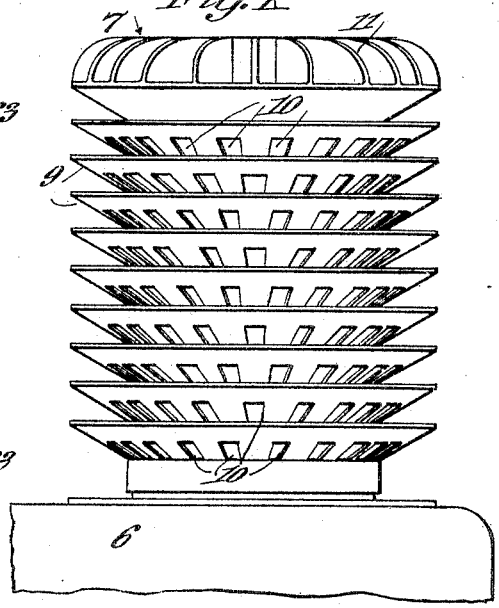
Witnesses
Geo. L. Goetz
G. T. Hackley
Inventor
Ross M. G. Phillips
by Townsend Bros.
his attys.

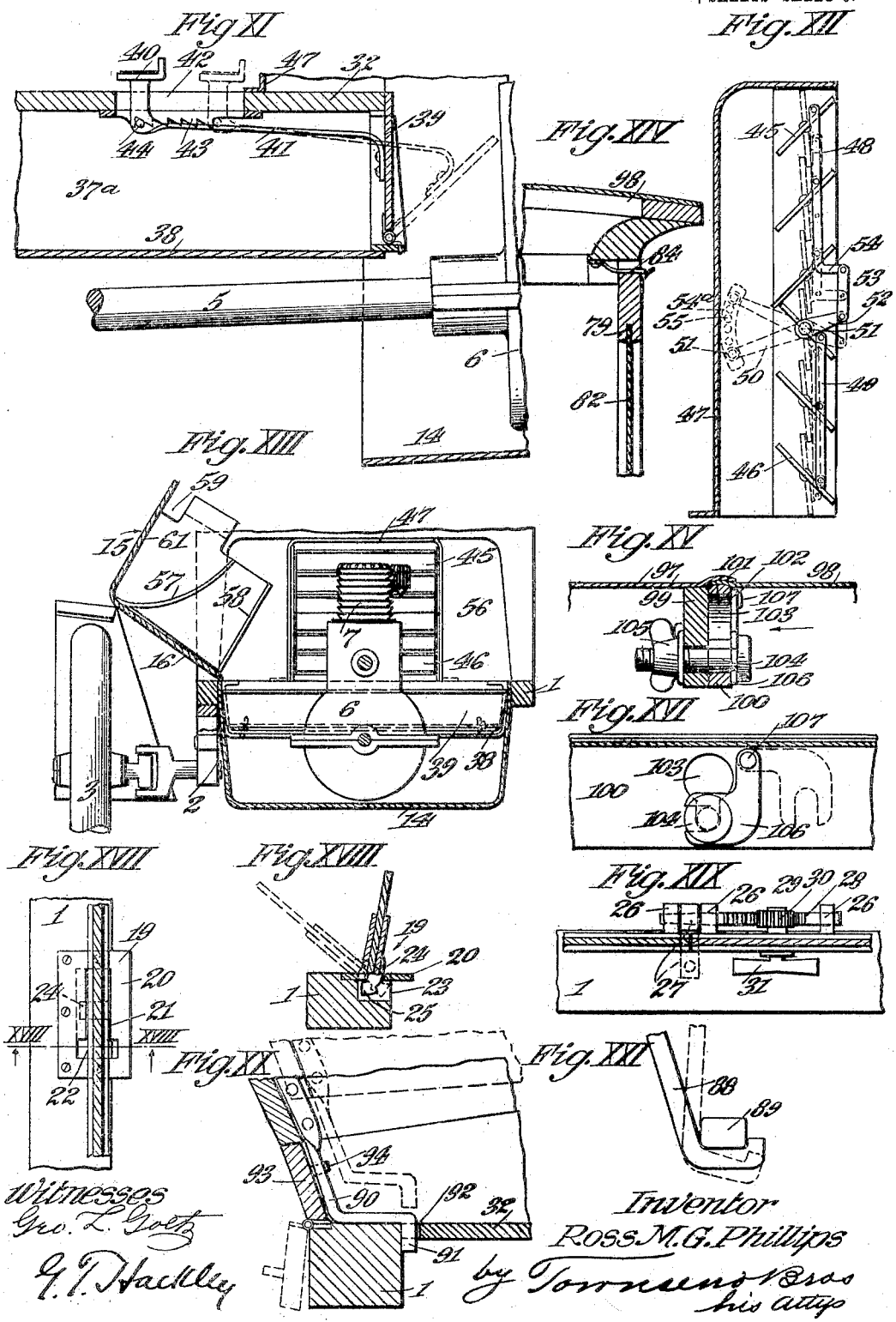

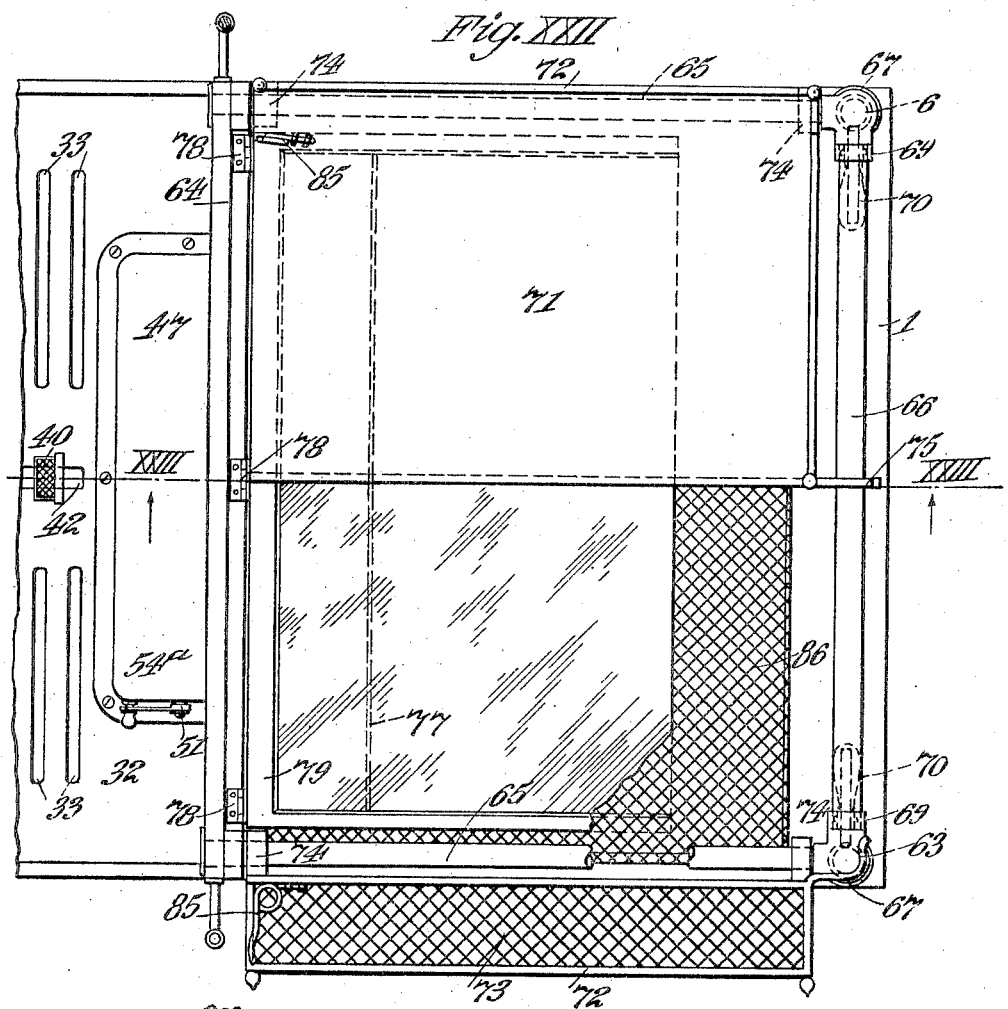
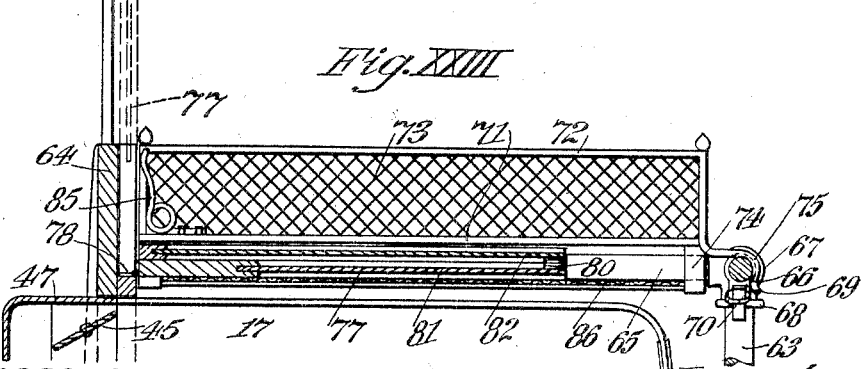

UNITED STATES PATENT OFFICE.

ROSS M. G. PHILLIPS, OF LOS ANGELES, CALIFORNIA.

MOTOR-CARRIAGE.

No. 797,533.        Specification of Letters Patent.        Patented Aug. 15, 1905.

Application filed August 22, 1903. Serial No. 170,395.

*To all whom it may concern:*

Be it known that I, ROSS M. G. PHILLIPS, a citizen of the United States, residing at Los Angeles, in the county of Los Angeles and State of California, have invented new and useful Improvements in Motor-Carriages, of which the following is a specification.

This invention relates particularly to improvements in the body of motor-vehicles, and comprises means for cooling the motor and warming the interior of the body.

One object of the invention is to provide a new and improved means for air-cooling the engine, particularly the cylinders and exhaust and inlets and for conducting the warm air from the engine to the interior of the rig, so as to heat the same. This is a very desirable feature for rigs which are to be used in cold climates. The cost of warming the rig is nothing, because air which circulates around the engine, when the engine is in operation, is conducted by suitable means to the rig instead of being allowed to escape into the atmosphere.

Another object is to provide improved means whereby a two-seated covered rig may be readily transformed into a single-seated covered rig, the appearance of the rig before being converted being that of a surrey and after being converted having the appearance of a coupé.

Another object is to provide a novel shield or wind-break, which may be folded up and housed in compact form on the bonnet.

Another object is to provide a new and improved bonnet for the engine, which is constructed so as to be readily opened to permit access to the engine and which when open does not obstruct the interior of the carriage and which can be instantly detached.

The accompanying drawings illustrate the invention.

Referring to the drawings, Figure I is a longitudinal vertical section taken through the rig equipped as a surrey, the engine being shown in elevation. Fig. II is a side elevation of the rig in surrey form. Fig. III is a side elevation of the rig converted to coupé form. Fig. IV is a front elevation of the rig. Fig. V is a perspective of the bonnet, wind-break housing, and parcel-basket. Fig. VI is a detail of the device for connecting the two panels of glass, which constitute the wind-break. Only a portion of the panels are shown in connection therewith. Fig. VII is a section on line VII VII, Fig. VI. Fig. VIII is a sectional perspective through the bonnet and engine-chamber. The parts within are shown in perspective, the engine being shown in dotted lines, so as not to obscure the air-flues. Fig. IX is a horizontal sectional view taken through the bonnet. Fig. X is a side elevation of a cylinder of the motor, showing the construction of the cooling-flanges. Fig. XI is a detail view, partly in section, of the foot-actuated means for operating the damper which controls the admission of warm air to the vehicle. Fig. XII is a side elevation of the adjustable shutters and box, the box being shown in section. Fig. XIII is a transverse section through the bonnet and hood, showing the engine in elevation, one section of the hood being tipped back and shown resting against a mud-guard. Fig. XIV is a detail showing the means for fastening the canopy-frame to its support. Fig. XV is a detail in section, showing the means for fastening the two sections of the canopy together. Fig. XVI is a side elevation of what is shown in Fig. XV looking in the direction of the arrow. Fig. XVII is a detail in plan of the detachable hinge for the bonnet-sections. Fig. XVIII is a section on line XVIII XVIII, Fig. XVII. Fig. XIX is a detail of the locking-bolt and operating-handle of the bonnet. Fig. XX is a detail showing the rear attachment of the rear seat to the vehicle. Fig. XXI is a detail of the front attachment for the rear seat. Fig. XXII is a plan view of the luggage-carrier and supporting-frame, showing one section of the luggage-carrier tipped up. The wind-break is shown folded up. Fig. XXIII is a sectional view on line XXIII XXIII, Fig. XXII.

The chassis embraces a frame 1, which is suspended by springs 2.

3 designates the wheels.

The driving-axle 4 is driven through the medium of a driving-shaft 5, which extends from the engine 6, which is mounted in the front end of the chassis.

7 designates the forward engine-cylinder. 8 designates the rear engine-cylinder. Each cylinder is provided with conical flanges 9, which flare toward their upper edges, the flanges 9 being provided with radial slots 10, which extend, preferably, from the junction of the flanges with the cylinder-wall, but terminate a short distance from the rim of the flanges, as shown. Each flange has a neck $9^a$, which is shrunk on the cylinder-wall, the neck of one flange lying within the flared part of the underlying flange. The flanges are preferably of a good heat-conducting metal, such as copper, to secure maximum radiation. The slots are staggered, so that slots of adjacent flanges are out of register. The head of the cylinder is provided with radial ribs 11.

12 is the engine fly-wheel the periphery of which carries vanes 13, forming a fan. The position of the fly-wheel is such that the fan extends over the highest point of the engine-cylinders, extending over the lower part of the engine a proportionate distance.

The lower parts of the engine, fly-wheel, and fan are protected by a hood 14, which is carried by the frame 1. The front wall of the hood 14 is provided with a screen $15^a$ for the admission of air. The bonnet 15 covers the engine and is formed of two sections 16 and 17. The front of each section is provided with a screen 18, and each section is hinged at its lower edge to the frame 1 by a pair of hinges 19. Each hinge 19 comprises a plate 20, which is provided with a slot 21, the forward portion of which is enlarged by an offset 22. The frame 1 underneath the plate 20 is cut away to form a recess 23. The bonnet-sections carry toes 24, which may be inserted through the enlarged part of the slots 22, and the hood may then be pushed to the rear to bring projections 25 of the toe underneath the edges of the plate 20, which prevent the toe from being lifted through the narrow part of the slot 21. The hood may be turned back until it rests against the mud-guard, as shown in Fig. XIII, when it is desired to inspect the engine or other parts within the bonnet. In order to remove the bonnet, the section may be pulled forward to bring the toe under the enlarged part of the slot, at which time the bonnet may be lifted out. (See Figs. XIII, XVII, and XVIII.) Each section of the bonnet carries lugs 26, which are provided with tapered holes.

27 is a lug carried by the frame 1, which stands between the two lugs 26 when the two sections of the bonnet are in the proper position.

28 is a bolt the end of which is tapered to fit the taper-holes in lugs 26 and 27 and which is provided with a rack 29, which engages a gear 30, carried on the stud of a handle 31. By turning the handle 31 the bolt 28 may be moved into or out of the lugs 26 and 27 to lock or unlock the two sections of the bonnet. The taper of the bolt 28 results in holding the two sections tightly in position, and they are by the same means prevented from rattling.

32 designates the floor of the rig, which at its front end is provided with air-passages 33. The rear part of the floor 32 is provided with air-passages 34.

35 is a slotted plate slidably mounted in ways 36 and which is provided with a toe-piece 37, whereby it may be shifted to close or open the air-passages 34.

An air-chamber 37 is formed underneath the floor 32 by a box 38. The box 38 at its forward end communicates with the engine-chamber formed by the bonnet 15 and hood 14, and the box 38 extends back to embrace the air-passages 34. The forward end of the box 38 is provided with a hinged door or damper 39, which may be opened or closed by means of a foot-piece 40, which is carried on the end of a spring-arm 41, attached to the damper 39. (See Fig. XI.) The foot-piece 40 projects through a slot 42 in the floor and is adjustably held in the position desired by means of a rack 43, carried on the under side of the floor 32, there being a pin 44 on the end of the spring-arm 41, which engages the teeth on the rack 43. The natural spring of the spring-arm 41 holds the pin 44 in engagement with a tooth of the rack 43. Hot air from within the engine-chamber may be admitted to the air-chamber 37 by opening or closing the damper 39. In order to provide a circulation of warm air, I have provided a series of shutters 45 and 46, which are situated immediately back of the engine and are incased by a box 47, to which they are pivoted. The box 47 forms a heater in the front end of the rig which warms that part of the rig. The shutters 45 are inclined reversely to the shutters 46, so that warm air from the top of the engine chamber or bonnet passes through between the shutters 45 and is deflected downwardly thereby and then passes out through shutters 46, thence down into the air-chamber 37, if the damper 39 is opened, as shown in Fig. I. If the damper 39 is closed, the warm air does not enter the air-passage 37, but continues down and passes out through the rear opening of the hood 14 into the atmosphere. The shutters 45 are connected by a link 48, while the shutters 46 are connected by a link 49.

50 is a crank on the outside of the box 47, which is mounted on the end of a shaft 51, which projects through the side of the box 47. The shaft 51 carries the upper shutter of the series of shutters 46, and the crank 50 is connected by a link 53 with an offset 54 from the link 48.

$54^a$ is a segment provided with shallow depressions 55, which are adapted to receive a small knob on the inner end of the crank. The spring of the crank yieldingly holds the knob in a depression, and the crank is thereby adjustably held in the position into which it is moved. When the crank is in the position shown in Fig. XII, the shutters are opened; but by throwing the crank upward the shutters may be closed or partially closed, according to the distance the crank 50 is moved. This permits of entirely shutting off the hot air from the box 47 or for controlling the amount of hot air which is admitted to the box 47. The box 47 is detachably fastened to a superstructure 56 and communicates with the rear portion of the bonnet 15.

In operation air enters the bonnet 15 through the screens 18, and in order to conduct the entering air to the cylinders I provide flues 57 and 58. (See Figs. VIII and IX.) The flue 57 is curved to embrace the forward cylinder, and the lower part of the flue extends to a point about half-way down the bonnet. The flue 58 is curved in such a way as to conduct air from the lower part of the bonnet up, back, and outside of the flue 57 to the rear cylinder. The air which enters through the upper part of the screen 18 is carried by the flue 57 to the forward cylinder, and air which enters the lower part of the screen is carried to the rear cylinder. Thus each cylinder receives volumes of unheated air of equal temperature, each cylinder heating its share of air, so that the temperature of the aggregate volume of air being heated is practically the same, and a greater amount of air can be heated to a higher degree and more uniform temperature than if the entire volume of air were first conducted to one cylinder, there partially heated, and then conducted to the next cylinder. Furthermore, by this construction the rear cylinder is more perfectly kept cooled as it receives cold air directly from the outside. As cold air from the flues strikes the cylinders between the flanges 9 it becomes heated and rises through the slots in the flanges, and as the slots are staggered the air is given a partial peripheral draft which augments the cooling effect on the cylinder and increases its absorption of heat. As the flanges are inclined the warm air rises more readily than would be the case were they horizontal, there being no chance for dead air to become pocketed. While I have only shown two cylinders and two flues in the drawings, it should be understood that three, four, or more cylinders in a row, one back of the other, could be cooled by the employment of an air-flue for each cylinder, each flue leading directly to a cylinder and each flue conducting cold air from outside the bonnet directly to its cylinder. I do not limit myself to the employment of two cylinders or two flues, as the employment of flues for conducting air to cylinders is believed to be new. The fan 13 stirs up the entering air and forces it back through the flues. The flue 57 at its upper rear edge is provided with a narrow opening 59, and the flue 58 is likewise provided with a narrow opening 60. The two openings 59 and 60 allow air which has been heated to escape from the respective flues into the upper part of the bonnet and to pass therefrom to the box 47. The upper edges 61 and 62 of each flue are joined to the top of the bonnet, each flue being in two sections parting through the middle, one section of each flue being fastened to its respective section of the bonnet, so that when closed the middle joints sit closely together, but permit the two sections of bonnet to be turned back on their hinges, each section carrying with it its respective sections of flues. Air also enters through the screen 51 in the front part of the hood 14 and circulates around the lower part of the casing of the engine and thence passes out at the rear of the hood 14, although some of the air which enters through the screen 15 is mixed with some of the air which enters through the screen 18 by the revolution of the fan on the fly-wheel.

Referring now particularly to Fig. V, 63 designates a pair of posts or standards mounted on the frame 1. Hinged to the superstructure 56 is a back 64, and attached thereto is a frame formed by side rods 65 and a front rod 66. The rod 66 is joined at each end to the rods 65 by hollow joints 67, which are cupped to fit over the upper ends of the standard 63. (See also Figs. XXII and XXIII.) The upper ends of the standards 63 are provided with flanges 68, upon which the joints 67 rest. 69 represents straps carried by the front rod 66, which have pivoted thereto respective latches 70, which engage underneath the flanges 68 and detachably lock the frame on the standards 63. A luggage-carrier is supported by the described framework and comprises two sections. Each section of the luggage-carrier comprises a bottom 71 and retaining-frames 72, which may preferably be filled with woven wire 73. The bottom of each section is provided with a pair of lugs 74, which are journaled on the side rods 65. Each frame also carries a hook 75, which is adapted to spring over the front rod 66, and thereby hold its section of the luggage-carrier in position.

76 is a ledge which is mounted on the frame of a wind-break about to be described, upon which the rear portion of the bottom 71 rests when the wind-break is raised. The wind-break comprises a lower frame 77, which is hinged at 78 to the front part of the back 64. An upper frame 79 is hinged, as at 80, to the lower frame 77. The upper and lower frames of the wind-break each carry panels of glass 81 and 82. The upper frame is adapted to be folded down flat against the lower frame when not in use. In order to hold the upper frame in position when the wind-break is opened out and in use, I have provided a pair of slides 82, which are retained on grooved portions 83 in the two frames 77 and 79. By moving the slides 82 entirely onto the upper frame 79 the upper frame may be folded down flat against the lower frame, and when the upper frame is opened out to occupy the same plane with the lower frame both slides 82 may be moved down into the position shown in Fig. V to cover the joint between the two frames and prevent the upper frame from moving relatively to the lower frame.

84 designates a pair of hooks with spring-shanks fastened to the cover of the vehicle, which are adapted to clamp the upper part of the frame 79 to hold the wind-break in vertical position, and as a safeguard against the wind-break dropping in the event that the hooks 84 should release the same I have provided a pair of stiff springs 85, one of which is carried by each section of the luggage-carrier. These springs rest against the frame 77 and are sufficiently strong to hold the wind-break in position without the aid of the hooks 84. By opening up both sections of the luggage-carrier the wind-break may be folded and laid upon the top of the bonnet. Then the two sections of the luggage-carrier may be restored to position so that they cover and protect the wind-break and form a perfect housing for the same.

86 is a netting supported by the side rods 65, upon which the wind-break rests when it is folded up and housed.

The carriage is provided with a detachable rear seat, and the canopy is made in two sections, so that when the rear seat is removed the rear section of the canopy may also be removed. This gives a neat appearance to the rig and converts it into coupé form, as shown in Fig. III. The rear seat 87 is provided with a pair of hooks 88, which are adapted to engage lugs 89 on the floor 32. (For detail see Fig. XXI.) The rear part of the seat is provided with angle-irons 90, each of which has a lug 91, adapted to enter a slot 92 in the floor 32. A tail-board 93 is hinged to the body of the vehicle and is provided with studs adapted to enter the holes in the angle-irons 90 when the angle-irons are in the position shown in Fig. XX and the tail-board closed. This prevents the seat from being lifted up. In order to remove the seat, the rear section of the canopy is first removed, the tail-board is then dropped, which releases the angle-irons 90, and the seat may then be tipped into the position shown in dotted lines, Fig. I. The hooks 88 may then be readily slipped out from under the lugs 89, which permits the seat to be entirely removed from the vehicle.

The front section of the canopy is supported by standards 95, which extend up from the back of the front seat, the standards 95 being supported by the superstructure 56. The rear part of the rear section of the canopy is supported by standards 96, which extend up from the back of the vehicle, the lower ends of the standard taking into suitable sockets in the frame. The two sections of the canopy designated 97 and 98 are provided with cross-ribs 99 and 100, and the section 97 has a lip 101, which laps over a curved lip 102 on the front section 98. The ribs 99 and 100 are provided with registering buttonhole-slots 103. 104 represents bolts which pass through the slots and are provided with thumb-nuts 105 for clamping the two ribs together. 106 designates guards, one of which is provided for each bolt, and each guard is pivoted at 107, as shown, and is forked to take over a bolt 104. When the two sections of the canopy are fastened together, the bolts 104 lie in the contracted portions of the slots 103, with the guards 106 lying back of the heads of the bolts. To remove the rear section of the canopy, the thumb-nuts 105 are loosened, and the guards 106 are then slipped into the position shown in dotted lines in Fig. XVI. The rear section of the canopy may then be raised to bring the heads of the bolts out through the larger part of the slots 103. The canopy may be preferably provided with a series of ventilating-outlets 108 and may also be provided with suitable side and back curtains 109. The front section of the canopy may also be provided with a pair of narrow curtains 110, which may be drawn down to cover the narrow openings on each side of the wind-break.

The luggage-carrier may be tilted up into the position shown in dotted lines to give access to the bonnet.

The heater-box 47 is detachably fastened to the frame and may be removed when desired.

What I claim is—

1. In a motor-carriage, in combination, a body, a bonnet on the body, an engine within the bonnet, and suitable flues within the bonnet, each flue communicating with its respective cylinder for conducting air from outside the bonnet to the respective engine-cylinders.

2. In a motor-carriage, in combination, a body, a bonnet on the body, an engine within the bonnet, suitable flues within the bonnet, each flue communicating with its respective cylinder for conducting air from outside the bonnet to the engine-cylinders, and a detachable heater communicating with the bonnet.

3. In a motor-carriage, in combination, a body, a box forming an air-passage under the body, a bonnet on the body, an engine within the bonnet, means for conducting heated air from the engine to the air-chamber, suitable air-inlets for admitting air from the air-passage to the body, and means for regulating the amount of air admitted from the air-chamber to the body.

4. In a motor-carriage, in combination, a body, a box forming an air-passage under the body, a bonnet on the body, an engine within the bonnet, means for conducting heated air from the engine to the air-chamber, suitable air-inlets for admitting air from the air-passage to the body, means for regulating the amount of air admitted from the air-chamber to the body, said regulating means comprising a slotted plate slidably mounted adjacent the inlets for opening or closing the same.

5. In a motor-carriage, in combination, a body, a bonnet on the body, an engine within the bonnet, the front end of said bonnet being provided with a screen, a fan actuated by the engine and suitable flues for conducting air from the fan to the respective engine-cylinders.

6. In a motor-carriage, in combination, a body, a bonnet on the body, an engine within the bonnet, the front end of said bonnet being provided with a screen, a fan actuated by the engine and suitable flues for conducting air from the fan to the respective engine-cylinders, a box forming an air-chamber beneath the body, said box communicating with the bonnet and having air-inlets which communicate with the body, and means for regulating the amount of air admitted from the bonnet to the air-chamber.

7. In a motor-carriage, in combination, a body, a bonnet on the body, an engine within the bonnet, the front end of said bonnet being provided with a screen, a fan actuated by the engine, suitable flues for conducting air from the fan to the respective engine-cylinders, a box forming an air-chamber beneath the body, said box communicating with the bonnet and having air-inlets which communicate with the body, a damper in the front end of said box, a foot-piece connected with the damper and a rack for engaging the projection connected with the foot-piece.

8. In a motor-carriage, in combination, a body, a bonnet on the body, an engine within the bonnet, the bonnet comprising two sections, each of which is hinged to the body, the front end of the bonnet being provided with a screen, a flue for conducting air from the upper part of the bonnet to the forward engine-cylinder, another flue for conducting air from the lower part of the bonnet to a cylinder to the rear of the first-named cylinder.

9. In a motor-carriage, in combination, a body, a bonnet on the body, an engine within the bonnet, the bonnet comprising two sections, each of which is hinged to the body, the front end of the bonnet being provided with a screen, a flue for conducting air from the upper part of the bonnet to the forward engine-cylinder, another flue for conducting air from the lower part of the bonnet to a cylinder to the rear of the first-named cylinder, and a fan operated by the engine and situated between the screen and the mouths of the flues.

10. In a motor-carriage, in combination, a body, a bonnet on the front end of the body comprising two sections, each of which is hinged to the body by a hinge comprising a plate having a buttonhole-slot, the frame of the body being cut away between the slot and a lug on the bonnet adapted to enter the slot, said lug having a projection adapted to engage with the walls of the slot underneath the plate.

11. In a motor-carriage, in combination, a body, a bonnet on the body comprising two sections, each of which is hinged to the body, means for locking the two sections in position comprising a pair of lugs mounted on one section, a taper-bolt having a rack, a handle swiveled in said section, a pinion mounted on a stud projecting from said handle and engaging said rack, a stationary lug on the body having a tapered hole registering with the bolt, the other section of the bonnet having a lug provided with a tapered hole also registering with said bolt.

12. In a motor-carriage, in combination, a body, a bonnet on the front end of the body comprising two sections, each of which is hinged to the body, an engine within the bonnet, flues within the bonnet for conducting air to the respective cylinders of the engine, a flue comprising a pair of symmetrically-curved plates, one of which is carried by each section of the bonnet, the upper edge of each plate being cut away to form an air-passage.

13. In a motor-carriage, in combination, a body, a bonnet on the body, an engine in the bonnet, a detachable heater comprising a box communicating with the rear of the bonnet, shutters pivoted in the box and means for opening and closing said shutters.

14. In a motor-carriage, in combination, a body, a bonnet on the body, an engine in the bonnet, a detachable heater comprising a box, two series of shutters pivoted within the box, links connecting the respective series, the upper series of shutters having their lower edges to the rear when open, the lower series of shutters having their lower edges to the front when open, links connecting the respective shutters of the respective series, one of said links being offset, a shaft, a lever on the shaft, a link connecting one end of the lever with the offset, and means for holding said lever in various positions.

15. In a motor-carriage, in combination, a body, a bonnet on the body, an engine in the bonnet, a detachable heater comprising a box, two series of shutters pivoted within the box, links connecting the respective series, the upper series of shutters having their lower edges to the rear when open, the lower series of shutters having their lower edges to the front when open, links connecting the respective shutters of the respective series, one of said links being offset, a shaft, a lever on the shaft, a link connecting one end of the lever with the offset, means for holding said lever in various positions, comprising a segmental plate provided with shallow depressions, a handle on the lever and a knob on the lever for engaging in said depressions, said lever being formed of spring material.

16. In a motor-carriage, in combination, a body, an engine, means for conducting unheated air to the engine to cool the engine and heat the air, and means for diverting the heated air from said engine to the body and for causing the heated air to radiate or be diffused within an inclosure under the floor of the body whereby the interior of the body may be warmed indirectly by conduction of heat through the floor.

In testimony whereof I have signed my name to this specification, in the presence of two subscribing witnesses, at Los Angeles, in the county of Los Angeles and State of California, this 13th day of August, 1903.

ROSS M. G. PHILLIPS.

Witnesses:
 GEORGE T. HACKLEY,
 F. M. TOWNSEND.